(12) United States Patent
Rhee et al.

(10) Patent No.: US 7,211,308 B2
(45) Date of Patent: May 1, 2007

(54) FORMATION OF MULTILAYER SHEETS CONTAINING PCTFE AND COC FOR BLISTER PACKAGING APPLICATIONS

(75) Inventors: Sangkeun Rhee, Alburtis, PA (US); Michael P. Della Vecchia, East Hanover, NJ (US)

(73) Assignee: Honeywell International Inc., Morristown, NJ (US)

( * ) Notice: Subject to any disclaimer, the term of this patent is extended or adjusted under 35 U.S.C. 154(b) by 157 days.

(21) Appl. No.: 10/783,355

(22) Filed: Feb. 20, 2004

(65) Prior Publication Data

US 2005/0186379 A1 Aug. 25, 2005

(51) Int. Cl.
*B32B 25/08* (2006.01)
*B32B 27/08* (2006.01)
*B32B 27/18* (2006.01)
*B32B 37/12* (2006.01)

(52) U.S. Cl. .................. 428/36.91; 428/421; 428/422; 428/424.8; 428/476.3; 428/476.9; 428/483; 428/515; 428/519; 428/520; 428/522; 428/523; 428/910; 156/244.11; 156/334; 264/173.12

(58) Field of Classification Search .......... 524/271; 525/97, 98; 428/36.91, 421, 422, 424.8, 428/483, 476.3, 515, 476.9, 519, 520, 522, 428/523, 910; 156/244.11, 334; 264/173.12
See application file for complete search history.

(56) References Cited

U.S. PATENT DOCUMENTS

| 3,645,992 | A | 2/1972 | Elston .................. 260/80.78 |
| 4,146,521 | A | 3/1979 | Godfrey .................... 260/27 |
| 4,826,955 | A | 5/1989 | Akkapeddi et al. ......... 528/324 |
| 5,139,878 | A | 8/1992 | Kim et al. ................. 428/421 |
| 5,218,049 | A | 6/1993 | Yamamoto et al. ........... 525/97 |
| 5,272,236 | A | 12/1993 | Lai et al. ................ 526/348.5 |
| 5,278,272 | A | 1/1994 | Lai et al. ................ 526/348.5 |
| 5,541,267 | A | 7/1996 | Akkapeddi et al. ......... 525/432 |
| 5,591,792 | A * | 1/1997 | Hattori et al. ............. 524/271 |
| 5,783,273 | A | 7/1998 | Yamamoto et al. ........ 428/35.9 |
| 5,912,070 | A | 6/1999 | Miharu et al. ............. 428/214 |
| 5,936,037 | A * | 8/1999 | Tasaka ................... 525/92 B |
| 6,074,719 | A | 6/2000 | Fukushi et al. ........... 428/36.9 |

(Continued)

FOREIGN PATENT DOCUMENTS

| EP | 857758 A1 | 8/1998 |
| JP | 09302319 A | 11/1997 |

OTHER PUBLICATIONS

English language translation of JP 09-302319 A, Nov. 1997.*

(Continued)

*Primary Examiner*—Ramsey Zacharia
(74) *Attorney, Agent, or Firm*—Roberts & Roberts, L.L.P.

(57) ABSTRACT

Multilayer sheets and films are provided that include a layer of a fluoropolymer material and a layer of a thermoplastic polymer material. More particularly, an adhesive material and multilayered structures formed therewith are provided in which a layer of a fluoropolymer material is attached to a layer of another thermoplastic polymer. The adhesive material is useful to adhere layers of dissimilar polymeric materials that are otherwise incompatible, and achieves a significantly improved interlayer bond strength between fluoropolymer and thermoplastic polymer layers as compared to the art.

45 Claims, 1 Drawing Sheet

U.S. PATENT DOCUMENTS

| | | | |
|---|---|---|---|
| 6,132,827 A | 10/2000 | Miro | 428/35.9 |
| 6,138,830 A | 10/2000 | Muggli | 206/532 |
| 6,143,818 A | 11/2000 | Wang et al. | 524/528 |
| 6,232,391 B1 | 5/2001 | Sambasivam et al. | 524/505 |
| 6,319,979 B1 | 11/2001 | Dubois et al. | 524/570 |
| 6,582,829 B1 * | 6/2003 | Quinn et al. | 428/513 |
| 2004/0197567 A1 | 10/2004 | Tsai et al. | 428/421 |

OTHER PUBLICATIONS

Encyclopedia of Polymer Science and Engineering, vol. 16, pp. 174-175, Oct. 1989.*

* cited by examiner

FORMATION OF MULTILAYER SHEETS CONTAINING PCTFE AND COC FOR BLISTER PACKAGING APPLICATIONS

BACKGROUND OF THE INVENTION

1. Field of the Invention

The invention relates to multilayer sheets and films including a layer of a fluoropolymer and a layer of a thermoplastic polymer. More particularly, the invention pertains to multilayered structures having at least one layer of a fluoropolymer and having improved interlayer adhesion between a fluoropolymer layer and adjacent layers. The invention also relates to adhesives useful to adhere layers of dissimilar polymeric materials that are otherwise incompatible, and particularly to an adhesive that achieves a significantly improved interlayer bond strength between a fluoropolymer and a thermoplastic polymer layer.

2. Description of the Related Art

A wide variety of thermoplastic polymers are known, as are films formed from such thermoplastic polymers. Important physical characteristics of such films include their barrier properties, including barriers to gas, aroma, and/or vapor such as water vapor, as well as its physical characteristics, such as toughness, wear and weathering resistances, and light-transmittance. These properties are especially important in film applications such as, for example, in the use of films as a packaging material for food or medical products.

It is well known in the art to produce multilayer fluoropolymer films. See, for example, U.S. Pat. Nos. 4,146,521; 4,659,625; 4,677,017; 5,139,878; 5,855,977; 6,096,428; 6,138,830; and 6,197,393. Many fluoropolymer materials are commonly known for their excellent moisture and vapor barrier properties, and therefore are desirable components of packaging films, particularly lidding films and blister packages. In addition, fluoropolymers exhibit high thermal stability and excellent toughness. However, such use of fluoropolymers is restricted to specialty packaging applications due to their relatively high cost. A suitable means of reducing the cost of a packaging material fabricated from a costly polymer is to form multilayer structures in which the polymer film is laminated with other, less costly polymer films. This approach is particularly desirable for the fluoropolymer packaging applications since a thin layer of the fluoropolymer is often all that is needed to take advantage of the desirable properties of the fluoropolymer while minimizing the cost. However, fluoropolymers do not adhere strongly to most other polymers. In fact, most fluoropolymers are known for their non-stick characteristics. This is very disadvantageous, because poor bond strength between layers can result in the delamination of multilayer films.

To improve the bond strength between a layer of a fluoropolymer and a layer of a thermoplastic polymer (e.g. a non-fluoropolymer layer), an adhesive tie layer may be used between adjacent layers. For example, U.S. Pat. No. 4,677,017 discloses coextruded multilayer films which include at least one fluoropolymer film and at least one thermoplastic film which are joined by the use of an adhesive polymer, particularly ethylene/vinyl acetate polymers, as an adhesive tie layer. U.S. Pat. No. 4,659,625 discloses a fluoropolymer multilayer film structure which utilizes a vinyl acetate polymer adhesive tie layer. U.S. Pat. No. 5,139,878, discloses a fluoropolymer film structure using an adhesive tie layer of modified polyolefins. U.S. Pat. No. 6,451,925 teaches a laminate of a fluoropolymer layer and a non-fluoropolymer layer using an adhesive tie layer which is a blend of an aliphatic polyamide and a fluorine-containing graft polymer. Additionally, U.S. Pat. No. 5,855,977 teaches applying an aliphatic di- or polyamine to one or more surfaces of a fluoropolymer or non-fluoropolymer material layer.

As an alternative to an adhesive tie layer, a surface treatment of one or both of the layers has been used to increase the adhesive bond strength between the two dissimilar layers. For example, U.S. Pat. No. 6,197,393 describes treating a non-fluoropolymer layer by providing a bonding composition which comprises a primary or secondary di- or polyamine and a non-fluorinated base polymer, reacting these components to form an amine-functionalized base polymer, which base polymer materials may include polyamides, polyamide imides, polyether imides, polyimides, polyureas, polyurethanes, polyesters, polycarbonates, functionalized polyolefins and polyketones. This is then compounded with a second, different, non-fluorinated polymer to form a blend layer. The blend layer may then be processed with a fluoropolymer layer to form multilayered articles or structures. Additionally, U.S. Pat. No. 6,096,428 teaches the step of blending a carboxyl, carboxylate, anhydride, amide, imide, hydroxyl, or oxycarbonyl functional polyolefin with an organic or inorganic base and an organoonium compound, forming a non-fluorinated polymeric material. This non-fluorinated material is then capable of being laminated to a fluoropolymer layer under heat and pressure, and formed into articles or structures. U.S. Pat. No. 5,855,977 teaches a multilayered structure having a fluoropolymer layer and a non-fluorinated polymeric layer that has an aliphatic di- or polyamine present.

There is a continuing need in the art for further improvements in fluoropolymer films and film structures, particularly those which provide a film structure featuring low water vapor and gas transmission, and good physical characteristics. More particularly, there is a need in the art for multilayer fluoropolymer films which include non-fluoropolymer films that have good properties that are acceptable for forming packaging and lidding films. The present invention satisfies this need in the art. The invention provides an adhesive composition suitable for obtaining excellent bond strength between a fluoropolymer layer and a thermoplastic polymer layer or another fluoropolymer layer.

SUMMARY OF THE INVENTION

The invention provides a multilayered film comprising:
a) a fluoropolymer layer having first and second surfaces;
b) an adhesive tie layer, having first and second surfaces, on the fluoropolymer layer with the first surface of the adhesive tie layer on the first surface of the fluoropolymer layer; which adhesive tie layer comprises an adhesive combination of at least one tackifier, at least one ethylene/alpha-olefin copolymer and at least one styrenic block copolymer; and
c) a thermoplastic polymer layer, having first and second surfaces, on the adhesive tie layer, with the first surface of the thermoplastic polymer layer on the second surface of the adhesive tie layer.

The invention also provides an adhesive composition comprising an adhesive combination of at least one tackifier, at least one ethylene/alpha-olefin copolymer and at least one styrenic block copolymer.

The invention further provides a multilayered film comprising:
a) a poly(chlorotrifluoroethylene) layer having first and second surfaces;

b) an adhesive tie layer, having first and second surfaces, on the poly(chlorotrifluoroethylene) layer with the first surface of the adhesive tie layer on the first surface of the poly(chlorotrifluoroethylene) layer; which adhesive tie layer comprises an adhesive combination of at least one tackifier, at least one ethylene/alpha-olefin copolymer and at least one styrenic block copolymer;

c) a cyclic olefin copolymer layer, having first and second surfaces, on the adhesive tie layer, with the first surface of the cyclic olefin copolymer layer on the second surface of the adhesive tie layer; and d) at least one polymer layer on either the second surface of the poly(chlorotrifluoroethylene) layer, the second surface of the cyclic olefin copolymer layer, or both.

The invention still further provides a process for forming a multilayered film comprising:

a) forming a fluoropolymer layer having first and second surfaces;

b) attaching an adhesive tie layer, having first and second surfaces, to the polyolefin layer with the first surface of the adhesive tie layer on the first surface of the polyolefin layer; which adhesive tie layer comprises an adhesive combination of at least one tackifier, at least one ethylene/ alpha-olefin copolymer and at least one styrenic block copolymer; and c) attaching a thermoplastic polymer layer, having first and second surfaces, to the adhesive tie layer with the first surface of the thermoplastic polymer layer on the second surface of the adhesive tie layer.

DETAILED DESCRIPTION OF THE PREFERRED EMBODIMENTS

Figure 1:
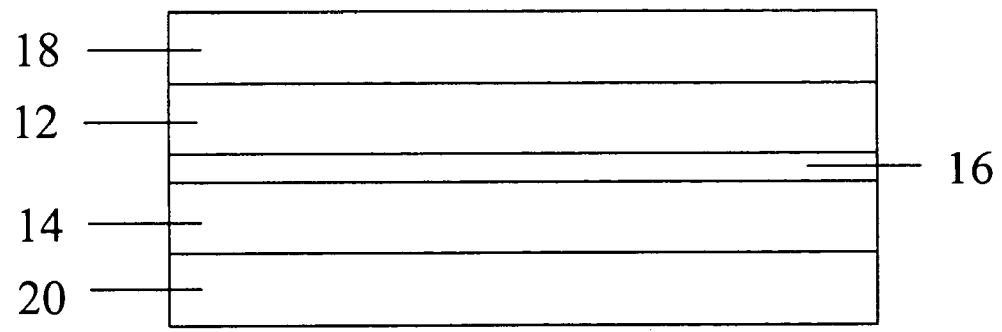
FIG. 1 is a plan-view, schematic representation of a multilayered film of the invention having a polymeric layer on both the fluoropolymer layer and the thermoplastic polymer layer.

As can be seen in FIG. 1, the invention provides a multilayered film 10 including at least one fluoropolymer layer 12 attached to at least one thermoplastic polymer layer 14. These layers are attached by an intermediate adhesive tie layer 16 which is an adhesive combination of at least one tackifier, at least one ethylene/alpha-olefin copolymer and at least one styrenic block copolymer. This adhesive tie layer 16 imparts excellent bond strength between adjacent layers of the film, and particularly between the fluoropolymer layer 12 and thermoplastic polymer layer 14. Once the individual films are attached, the multilayered structure 10 may be thermoformed into articles or cut into sheets without delamination.

The fluoropolymer layer 12 has first and second surfaces and is joined with the adhesive tie layer 16 such that the first surface of the fluoropolymer layer 12 is in contact with a first surface of the adhesive tie layer 16. Fluoropolymer materials are commonly known for their excellent chemical resistance and release properties as well as moisture and vapor barrier properties, and therefore are desirable components of packaging films. In the preferred embodiment of the invention, the fluoropolymer layer 12 may be comprised of fluoropolymer homopolymers or copolymers or blends thereof as are well known in the art and are described in, for example, U.S. Pat. Nos. 4,510,301, 4,544,721 and 5,139,878. Preferred fluoropolymers include, but are not limited to, homopolymers and copolymers of chlorotrifluoroethylene, ethylene-chlorotrifluoroethylene copolymer, ethylene-tetrafluoroethylene copolymer, fluorinated ethylene-propylene copolymer, perfluoroalkoxyethylene, polychlorotrifluoroethylene, polytetrafluoroethylene, polyvinyl fluoride, polyvinylidene fluoride, and copolymers and blends thereof. As used herein, copolymers include polymers having two or more monomer components. The most preferred fluoropolymers include homopolymers and copolymers of poly(chlorotrifluoroethylene). Particularly preferred are PCTFE (polychlorotrifluoroethylene homopolymer) materials sold under the ACLON™ trademark and which are commercially available from Honeywell International Inc. of Morristown, N.J.

In the production of the multilayered film 10 of the invention, the fluoropolymer layer 12 is joined with a thermoplastic polymer layer 14 via the adhesive tie layer 16. The thermoplastic polymer layer 14 has first and second surfaces and is attached to the fluoropolymer layer 12 such that the first surface of the thermoplastic polymer layer 14 is in contact with the second surface of the adhesive tie layer 16. Suitable thermoplastic polymer materials include non-fluoropolymer materials such as linear or branched polyolefin homopolymers, linear or branched polyolefin copolymers, cyclic olefin homopolymers, copolymers of cyclic olefins and linear or branched polyolefin homopolymers, copolymers of cyclic olefins and linear or branched polyolefin copolymers, ethylene vinyl acetate copolymers, polyesters such as polyethylene terephthalate, polyamides, polyvinyl chloride, polyvinylidene chloride, polystyrene, styrenic copolymers, polyisoprene, polyurethanes, ethylene ethyl acrylate, ethylene acrylic acid copolymers and combinations thereof. The thermoplastic polymer layer 14 may also comprise another fluoropolymer layer.

Suitable polyolefins for use herein include polymers of alpha-olefin monomers having from about 3 to about 20 carbon atoms and include homopolymers, copolymers (including graft copolymers), and terpolymers of alpha-olefins. Illustrative homopolymer examples include low density polyethylene (LDPE), ultra low density polyethylene (ULDPE), linear low density polyethylene (LLDPE), metallocene linear low density polyethylene (m-LLDPE), medium density polyethylene (MDPE), and high density polyethylene (HDPE), polypropylene, polybutylene, polybutene-1, poly-3-methylbutene-1, poly-pentene-1, poly-4,4 dimethylpentene-1, poly-3-methyl pentene-1, polyisobutylene, poly-4-methylhexene-1, poly-5-ethylhexene-1, poly-6-methylheptene-1, polyhexene-1, polyoctene-1, polynonene-1, polydecene-1, polydodecene-1 and the like.

Polyolefins such as polyethylenes are commonly differentiated based on the density which results from their numbers of chain branches per 1,000 carbon atoms in the polyethylene main chain in the molecular structure. Branches typically are $C_3$–$C_8$ olefins, more preferably propylene, butene, hexene or octene. For example, HDPE has very low numbers of short chain branches (less than 20 per 1,000 carbon atoms), resulting in a relatively high density, i.e. density ranges from about 0.94 gm/cc to about 0.97 gm/cc. LLDPE has more short chain branches, in the range of 20 to 60 per 1,000 carbon atoms with a density of about 0.90 to about 0.93 gm/cc. LDPE with a density of about 0.91 to about 0.93 gm/cc has long chain branches (20–40 per 1,000 carbon atoms) instead of short chain branches in LLDPE and HDPE. ULDPE has a higher concentration of short chain branches than LLDPE and HDPE, i.e. in the range of about 80 to about 250 per 1,000 carbon atoms and has a density of from about 0.88 to about 0.92 gm/cc.

Illustrative copolymers and terpolymers include copolymers and terpolymers of alpha-olefins with other olefins such as ethylene-propylene copolymers; ethylene-butene copolymers; ethylene-pentene copolymers; ethylene-hexene copolymers; and ethylene-propylene-diene copolymers (EPDM). The term polyolefin as used herein also includes acrylonitrilebutadiene-styrene (ABS) polymers, copolymers with vinyl acetate, acrylates and methacrylates and the like. Preferred polyolefins are those prepared from alpha-olefins, most preferably ethylene polymers, copolymers, and terpolymers. The above polyolefins may be obtained by any known process. The polyolefin may have a weight average molecular weight of about 1,000 to about 1,000,000, and preferably about 10,000 to about 500,000 as measured by high performance liquid chromatography (HPLC). Preferred polyolefins are polyethylene, polypropylene, polybutylene and copolymers, and blends thereof. The most preferred polyolefin is polyethylene. The most preferred polyethylenes are low density polyethylenes.

Suitable polyamides within the scope of the invention non-exclusively include homopolymers or copolymers selected from aliphatic polyamides and aliphatic/aromatic polyamides having a weight average molecular weight of from about 10,000 to about 100,000. General procedures useful for the preparation of polyamides are well known to the art. Such include the reaction products of diacids with diamines. Useful diacids for making polyamides include dicarboxylic acids which are represented by the general formula

HOOC-Z-COOH wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid. Suitable diamines for making polyamides include those having the formula $H_2N(CH_2)_nNH_2$ wherein n has an integer value of 1–16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4 trimethylpentamethylenediamine, as well as cycloaliphatic diamines, such as diaminodicyclohexylmethane, and other compounds. Other useful diamines include heptamethylenediamine, nonamethylenediamine, and the like.

Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid)(nylon 8), poly(9-aminononanoic acid) (nylon 9), poly(10-aminodecanoic acid) (nylon 10), poly(11-aminoundecanoic acid) (nylon 11) and poly(12-aminododecanoic acid) (nylon 12), while useful copolymers include nylon 4,6, poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly (hexamethylene azelamide) (nylon 6,9), poly(nonamethylene azelamide) (nylon 9,9), poly(decamethylene azelamide) (nylon 10,9), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Other useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Also included are other nylons which are not particularly delineated here.

Of these polyamides, preferred polyamides include nylon 6, nylon 6,6, nylon 6/6,6 as well as mixtures of the same. Of these, nylon 6 is most preferred.

Aliphatic polyamides used in the practice of this invention may be obtained from commercial sources or prepared in accordance with known preparatory techniques. For example, poly(caprolactam) can be obtained from Honeywell International Inc., Morristown, N.J.

Exemplary of aliphatic/aromatic polyamides include poly (tetramethylenediamine-co-isophthalic acid) (nylon 4,I), polyhexamethylene isophthalamide (nylon 6,I), hexamethylene adipamide/hexamethylene-isophthalamide (nylon 6,6/6T), hexamethylene adipamide/hexamethyleneterephthalamide (nylon 6,6/6T), poly (2,2,2-trimethyl hexamethylene terephthalamide), poly(m-xylylene adipamide) (MXD6), poly(p-xylylene adipamide), poly(hexamethylene terephthalamide), poly(dodecamethylene terephthalamide), polyamide 6T/6I, polyamide 6/MXDT/I, polyamide MXDI, and the like. Blends of two or more aliphatic/aromatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267, which are incorporated herein by reference.

Suitable cyclic (cyclo) olefin polymers (homopolymers, copolymers or blends) are described, for example, in U.S. Pat. Nos. 5,218,049; 5,783,273 and 5,912,070, which are incorporated herein by reference. U.S. Pat. No. 5,218,049 discloses films composed of cyclic olefins. U.S. Pat. No. 5,783,273 discloses press-through blister packaging materials comprising a sheet of a cyclic olefin copolymer. U.S. Pat. No. 5,912,070 discloses a packaging material comprising a layer of a cyclic olefin, a layer of a polyester and an intermediate adhesive. In the most preferred embodiment of the invention, the thermoplastic polymer layer 14 comprises a cyclic olefin copolymer. Cyclic olefins may be obtained commercially from Mitsui Petrochemical Industries, Ltd. of Tokyo, Japan, or Ticona of Summit, N.J.

The adhesive tie layer 16 preferably comprises an adhesive combination of at least one tackifier, at least one ethylene/alpha-olefin copolymer and at least one styrenic block copolymer. Combinations of said adhesive components include blends of said components. As used herein, a tackifier is intended to describe a material that improves the tackiness or stickiness of an adhesive system by improving the ability of adhesive system wetting out onto an adjacent surface. Preferred tackifiers or tackifier blends preferably have an interlayer bond strength of at least about 45 g/cm, as determined by the ASTM F904 method. Suitable tackifiers non-exclusively include terpene-based polymers, coumarone-based polymers, phenol-based polymers, rosin-based polymers, rosin esters and hydrogenated rosin esters, petroleum and hydrogenated petroleum-based polymers, styrene-based polymers and mixtures thereof.

Suitable terpene-based polymers include terpene polymers of alpha-pinene, beta-pinene, dipentel, limonene, myrcene, bornylene and camphene, and phenol-modified terpene-based polymers obtained by modifying these terpene-based polymers with phenols.

Suitable coumarone-based polymers include, for example, coumarone-indene polymers and phenol-modified coumarone-indene polymers.

Suitable phenol-based polymers include reaction products of phenols such as phenol, cresol, xylenol, resorcinol, p-tert-butylphenol, and p-phenylphenol with aldehydes such as formaldehyde, acetaldehyde and furfural, and rosin-modified phenol polymers.

Suitable rosin-based polymers include unmodified rosin (e.g., wood, gum, or tall oil) and rosin derivatives. Rosin-based polymers can be classified by their rosin acids, which are either an abietic acid or a pimaric acid. Abietic acid type rosins are preferred. Rosin derivatives include polymerized rosin, disproportionated rosin, hydrogenated rosin, and esterified rosin. Representative examples of such rosin derivatives include pentaerythritol esters of tall oil, gum rosin, wood rosin, or mixtures thereof.

Suitable petroleum and hydrogenated petroleum-based polymers include aliphatic petroleum polymers, alicyclic petroleum polymers, aromatic petroleum polymers using styrene, alpha-methylstyrene, vinyltoluene, indene, methylindene, butadiene, isoprene, piperylene and pentylene as raw materials, and homopolymers or copolymers of cyclopentadiene. Preferable petroleum polymers include aliphatic hydrocarbon polymers and hydrogenated polycyclodienic polymers. A wide range of unsaturated cyclic monomers can be obtained from petroleum derivatives, such as, for example, cyclopentene derivatives, cyclopentadiene derivatives, cyclohexene derivatives, cyclohexadiene derivatives, and the like. A wide range of unsaturated monomers can be obtained from petroleum derivatives, such as, for example, ethylene derivatives, propylene derivatives, butadiene derivatives, isoprene derivatives, pentenes, hexenes, heptenes, and the like.

Suitable styrene-based polymers include homopolymers which are low molecular weight polymers comprising styrene as a principal component, and copolymers of styrene with, for example, alpha-methylstyrene, vinyltoluene, and butadiene rubber.

The most preferred tackifiers are terpene-based polymers, petroleum and hydrogenated petroleum-based polymers.

In the preferred embodiment of the invention, the tackifier preferably comprises from greater than about 1% by weight to about 70% by weight of said adhesive combination, more preferably from about 5% by weight to about 30% by weight, and most preferably from about 15% by weight to about 25% by weight.

The ethylene/alpha-olefin copolymers of the adhesive composition are generally characterized as plastomers. In general, plastomers are comprised of polymerized, random copolymers of ethylene and one or more olefin comonomers.

Suitable ethylenes which may comprise the ethylene component of the ethylene/alpha-olefin copolymer preferably include polyethylenes such as low density polyethylene, ultra low density polyethylene, linear low density polyethylene, metallocene linear low density polyethylene, medium density polyethylene or high density polyethylene. Preferred ethylenes include polyethylene graft copolymers and linear and low density polyethylene copolymers.

Suitable olefins which may be copolymerized with an ethylene to form the ethylene/alpha-olefin copolymer include linear and branched alpha-olefins having 3 to 20 carbon atoms of which preparations are described, for example, in U.S. Pat. Nos. 3,645,992, 5,272,236, 5,278,272 and 6,319,979. Specific examples of the linear alpha-olefins are propylene, 1-butene, 1-pentene, 1-hexene, 1-heptene, 1-octene, 1-nonene, 1-decene, 1-undecene, 1-dodecene, 1-tridocene, 1-tetradecene, 1-pentadecene, 1-hexadecene, 1-heptadecene, 1-octadecene, 1-nanodecene and 1-eicocene. Specific examples of the branched alpha-olefins are 3-methyl-1-butene, 3-methyl-1-pentene, 4-methyl-1-pentene, 2-ethyl-1-hexene and 2,2,4-trimethyl-1-pentene. Of these, linear propylene, 1-butene, 1-pentene, 1-hexene, 1-octene and 1-decene are preferred. These alpha-olefins may be used singularly or in combination.

In the preferred embodiment of the invention, the ethylene/alpha-olefin copolymer comprises a copolymer comprising an ethylene and at least one alpha-olefin having from three to twenty carbon atoms ($C_3$–$C_{20}$). For example, the ethylene/alpha-olefin copolymer may comprise a copolymer of a linear low density polyethylene and a $C_3$–$C_{20}$ alpha-olefin, a terpolymer comprising ethylene and more than one $C_3$–$C_{20}$ alpha-olefin or a polyethylene graft copolymer including at lease one $C_3$–$C_{20}$ alpha-olefin.

In accordance with the present invention, suitable ethylene/alpha-olefin copolymers include modified compositions having at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid and anhydride and the like. Of these, the most preferred is maleic anhydride. In accordance with the invention, modified ethylene/alpha-olefin copolymer compositions preferably comprise from about 0.001 to about 20 percent by weight of the functional moiety, based on the total weight of the modified plastomer. More preferably the functional moiety comprises from about 0.05 to about 10 percent by weight, and most preferably from about 0.1 to about 5 percent by weight of the functional moiety. In the preferred embodiment of the invention, the ethylene/alpha-olefin copolymer is unmodified. However, a modified ethylene/alpha-olefin copolymer is preferred when said thermoplastic polymer layer comprises a polar material such as nylon or polyester.

In the preferred embodiment of the invention, the ethylene/alpha-olefin copolymers preferably have an ethylene content of from about 35 mole % to about 99.5 mole %, more preferably from about 70 mole % to about 90 mole % and most preferably from about 75 mole % to about 85 mole %. Accordingly, the ethylene/alpha-olefin copolymers of the invention preferably have an alpha-olefin content of from about 0.5 mole % to about 65 mole %, more preferably from about 10 mole % to about 30 mole % and most preferably from about 15 mole % to about 25 mole %. Further, said ethylene/alpha-olefin copolymer preferably comprises from about 40% by weight to about 98.9% by weight of said adhesive combination, more preferably from about 70% by weight to about 95% by weight and most preferably from about 75% by weight to about 85% by weight.

The styrenic block copolymer is preferably a styrenic copolymer selected from the group consisting of a styrene/ethylene-propylene/styrene block copolymer (SEPS), a styrene/ethylene ethylene-propylene random/styrene block copolymer (SEEPS), a styrene/butadiene/styrene block copolymer (SBS), a styrene/ethylene butylene random/styrene block copolymer (SEBS), a styrene/isobutylene/styrene block copolymer (SIBS), a styrene/isoprene/styrene block copolymer (SIS), a styrene/hydrogenated butylene/styrene block copolymer (SHBS) and a maleic anhydride grafted styrene/ethylene butylene/styrene copolymer (MAH-g-SEBS). Styrenic block copolymers are available in either a diblock type or the more common triblock types and mixtures thereof. Said styrenic block copolymer preferably comprises from about 0.1% by weight to about 80% by weight of said adhesive combination, more preferably from about 0.5% by weight to about 15% by weight and most preferably from about 1% by weight to about 6% by weight. The preferred styrenic block copolymers are styrene/isoprene/styrene block copolymer and styrene/ethylene butylene random/styrene block copolymer. Of these, styrene/isoprene/styrene block copolymer is the most preferred.

Figure 2:
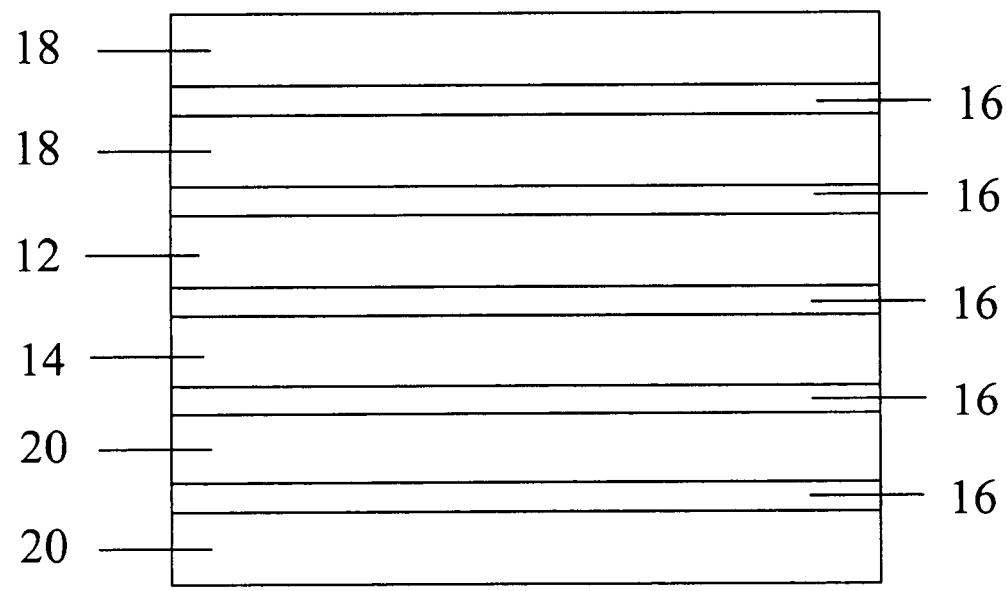
FIG. 2 is a plan-view, schematic representation of a multilayered film of the invention having multiple additional polymeric layers.

As seen in FIG. 1 and FIG. 2, the multilayered films 10 described herein may further comprise at least one additional polymer layer 18 or 20 that may be attached on either the outer surface of the fluoropolymer layer 12 or the outer surface of the thermoplastic polymer layer 14, or both. Said additional polymer layers 18 and 20 may comprise a layer of any material described herein, but is by no means limited to such materials. For example, optional layers 18 and/or 20 may comprise a layer of a fluoropolymer, a polyamide, a polyolefin, an ethylene vinyl acetate copolymer, polyethylene terephthalate, polyvinyl chloride, polyvinylidene chloride, polystyrene, styrenic copolymers, polyisoprene, polyurethanes, an ethylene acrylic acid polymer, a cyclic olefin homopolymer or copolymer and combinations thereof. As seen in FIG. 2, the multilayered film may include a plurality of additional layers 18 and 20. Each of layers 18 and 20 are preferably attached to the multilayered film via another adhesive tie layer 16 formed from said adhesive combination.

Each of the fluoropolymer layer 12, adhesive tie layer 16, thermoplastic polymer layer 14 and optional layers 18 and 20 may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, release agents, flame-retarding agents, oxidation inhibitors, oxidation scavengers, dyes, pigments and other coloring agents, ultraviolet light absorbers and stabilizers, organic or inorganic fillers including particulate and fibrous fillers, reinforcing agents, nucleators, plasticizers, as well as other conventional additives known to the art. Such may be used in amounts, for example, of up to about 30% by weight of the overall layer composition. It is also preferred that no layer of the film contains a tackifier composition but for layers that are labeled as adhesive layers. It is particularly preferred that neither of the outermost film layers contain a tackifier composition as defined herein. Representative ultraviolet light stabilizers include various substituted resorcinols, salicylates, benzotriazoles, benzophenones, and the like. Suitable lubricants and release agents include wax, stearic acid, stearyl alcohol, and stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also acceptable are hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benylenesulfonamide, and combinations of any of the above, as well as other plasticizers known to the art.

The multilayer films 10 of this invention may be produced by conventional methods useful in producing multilayer films, including coextrusion and lamination techniques. In the preferred embodiment of the invention, the thermoplastic polymer layer 14, the fluoropolymer layer 12 and any additional film layers are preferably attached by coextrusion with an adhesive tie layer 16. For example, the polymeric material for the individual layers are fed into infeed hoppers of a like number of extruders, each extruder handling the material for one or more of the layers. The melted streams from the individual extruders are directly fed to a multi-manifold die and then juxtaposed and combined into a layered structure or combined into a layered structure in a combining block and then fed into a single manifold or multi-manifold co-extrusion die. The layers emerge from the die as a single multiple layer film of polymeric material. After exiting the die, the film is cast onto a first controlled temperature casting roll, passes around the first roll, and then onto a second controlled temperature roll. The controlled temperature rolls largely control the rate of cooling of the film after it exits the die. Additional rolls may be employed. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. Typical coextrusion techniques are described in U.S. Pat. Nos. 5,139,878 and 4,677,017. One advantage of coextruded films is the formation of a multilayer film in a one process step by combining molten layers of each of the film layers, as well as any other optional film layers, into a unitary film structure.

Alternately, the individual layers may first be formed as separate layers and then laminated together under heat and pressure with or without intermediate adhesive layers. Lamination techniques are well known in the art. Typically, laminating is done by positioning the individual layers on one another under conditions of sufficient heat and pressure to cause the layers to combine into a unitary film. Typically the fluoropolymer film, the thermoplastic polymer film, the adhesive and any additional layers are positioned on one another, and the combination is passed through the nip of a pair of heated laminating rollers by techniques well known in the art. Lamination heating may be done at temperatures ranging from about 120° C. to about 175° C., preferably from about 150° C. to about 175° C., at pressures ranging from about 5 psig (0.034 MPa) to about 100 psig (0.69 MPa), for from about 5 seconds to about 5 minutes, preferably from about 30 seconds to about 1 minute. In the preferred embodiment of the invention, the multilayered film of the invention is formed by coextrusion.

The combination of the fluoropolymer layer 12 joined with the adhesive tie layer 16, the thermoplastic polymer layer 14 and any additional layers, may be uniaxially or biaxially oriented. For the purposes of the present invention the term draw ratio is an indication of the increase in the dimension in the direction of draw. The layers may be drawn to a draw ratio of from 1.5:1 to 5:1 uniaxially in at least one direction, i.e. its longitudinal direction, its transverse direction or biaxially in each of its longitudinal and transverse directions. For example, the multilayered film of the invention may be uniaxially oriented from about 1.3 to about 10 times in either its longitudinal or transverse directions, or the multilayered film of the invention may be biaxially oriented from about 1.5 to about 5 times each of its longitudinal and transverse directions. The film may also be drawn to a lesser or greater degree in either or both of said longitudinal and transverse directions. The layers may be simultaneously biaxially oriented, for example orienting a film in both the machine and transverse directions at the same. This results in dramatic improvements in clarity, strength and toughness properties, as well as an improved moisture vapor transmission rate.

Although each layer of the multilayer film structure may have a different thickness, the fluoropolymer layer 12 has a preferred thickness of from about 0.01 mil (0.25 μm) to about 10 mil (254 μm), more preferably from about 0.1 mil (2.5 μm) to about 5 mil (127 μm), and most preferably from about 0.3 mil (7.6 μm) to about 4 mil (100 μm). The thermoplastic polymer layer 14 has a thickness of about 0.04 mil (1 μm) to about 20 mil (508 μm), a preferred thickness of from about 2 mil (50 μm) to about 15 mil (381 μm), more preferably from about 5 mil (127 μm) to about 13 mil (330 μm). The adhesive tie layers have a preferred thickness of from about 0.04 mil (1 μm) to about 4 mil (102 μm), more preferably from about 0.3 mil (7.6 μm) to about 1.5 mil (38 μm). Additional layers preferably have a thickness of from about 0.04 mil (1 μm) to about 20 mil (508 μm), more preferably from about 0.4 mil (10 μm) to about 10 mil (254 μm) and most preferably from about 0.8 mil (20 μm) to about 3 mil (76 μm). While such thicknesses are referenced, it is to be understood that other layer thicknesses may be produced to satisfy a particular need and yet fall within the scope of the present invention.

The multilayered films of this invention are useful as flat structures or can be formed, such as by thermoforming, into desired shapes. The films are useful for a variety of end applications, such as for medical packaging, pharmaceutical packaging, packaging of other moisture sensitive products and other industrial uses. The multilayered films of the invention are particularly useful for forming thermoformed three dimensionally shaped articles such as tubes, bottles, and as blister packaging for pharmaceuticals or any other barrier packaging applications. This may be done by forming the film around a suitable mold and heating in a method well known in the art.

Multilayered barrier articles may be also formed from the films of the invention by conventional injection or co-injection blow molding or stretch-blow molding and coextrusion blow molding techniques, and the like. The typical coinjection stretch-blow molding process consists of an injection molding process which softens the thermoplastic polymer in a heated cylinder, injects it while molten under high pressure into a closed pre-form mold, cooling the mold to induce solidification of the polymer, and ejecting the molded pre-form from the mold. The injection molded pre-form is then heated to a suitable orientation temperature, often in about the 90° C. to 120° C. range, and is then stretch-blow molded. The latter process consists of first stretching the hot pre-form in the axial direction by mechanical means such as by pushing with a core rod insert followed by blowing high pressure air (up to about 500 psi) to stretch in the hoop direction. In this manner, a biaxially oriented blown article is made. Typical blow-up ratios often range from about 5:1 to about 15:1.

The moisture vapor transmission rate (MVTR) of such films of the invention may be determined via the procedure set forth in ASTM F1249. In the preferred embodiment, the overall multilayered film according to this invention has a MVTR of from about 1.0 or less g/100 in²/day (15.5 g/m²/day) of the overall film at 37.8° C. and 100% relative humidity (RH), preferably from 0.0005 to about 0.7 g/100 in²/day (0.0077 to about 10.7 g/m²/day) of the overall film, and more preferably from 0.001 to about 0.06 g/100 in²/day (0.015 to about 0.93 g/m²/day) of the overall film, as determined by water vapor transmission rate measuring equipment available from, for example, Mocon.

The oxygen transmission rate (OTR) of the films of the invention may be determined via the procedure of ASTM D-3985 using an OX-TRAN 2/20 instrument manufactured by Mocon, operated at 25° C., 0% RH. In the preferred embodiment, the overall multilayered film according to this invention has an OTR of from about 50 or less cc/100 in²/day (775 g/m²/day), preferably from about 0.001 to about 20 cc/100 in²/day (0.015 to about 310 g/m²/day), and more preferably from about 0.001 to about 10 cc/100 in²/day (0.015 to about 150 cc/m²/day).

The following non-limiting examples serve to illustrate the invention.

EXAMPLE 1 (COMPARATIVE)

A two-layer PCTFE/COC (Aclon 1180™ from Honeywell/Topas® 8007F04 from Ticona) film was prepared in a multilayer coextrusion operation, wherein PCTFE (density: 2.11 g/cm³; melting point: 211° C.) and COC (density: 1.01 g/cm³; deflection temperature under load (DTUL; ISO 75–1, 02): 75° C. at 0.45 MPa; melt index (ASTM D1238): 30 g/10 minutes at 260° C. and 2.16 kg load) were simultaneously extruded under a set of conditions listed in Table 1. Two single screw extruders, a feed block, a coat hanger die and a take-up device (consisting of casting roll, chill roll, various idle and nip rolls and a winder) were involved in the operation. The COC was pumped by a Davis-Standard single screw extruder (38 mm (1.5") diameter; L/D=24/1). The PCTFE was pumped by a Davis-Standard single screw extruder (diameter: 32 mm (1.25"); L/D=24/1). Two molten materials were met at the feed block and spread out in the coat hanger die.

TABLE 1

Extrusion Conditions

| | 38 mm Extruder | 32 mm Extruder | 32 mm Extruder |
|---|---|---|---|
| Material | COC | Tie Layer | PCTFE |
| Extruder set temperature (° C.) | 235–249 | N/A | 271–281 |
| Screw speed (rpm) | 110 | N/A | 23 |
| Die set temperature (° C.) | | 274 | |
| Casting roll set temperature (° C.) | | 18 | |
| Chill roll set temperature (° C.) | | 23 | |

A two-layer flat molten extrudate (PCTFE/COC) came out from the die onto a surface of the casting roll and was drawn by the take-up device. The resulting film was about 274 μm total thickness which was composed of a PCTFE layer of about 24 μm thickness and a COC layer of about 250 μm thickness.

The interlayer bond strength of the resulting two-layer (PCTFE/COC) film was determined by using a standard ASTM testing method (ASTM F904). The test was done at a constant cross head speed of 30.48 cm/min. The testing, where the un-separated portion of the specimen was supported at 180° to the direction of the draw with COC layer straight, showed almost no interlayer bond strength (~0 g/2.54 cm).

EXAMPLE 2

A three-layer PCTFE/tie/COC coextruded film was prepared in a multilayer film coextrusion operation using the same PCTFE and COC materials as described in Example 1. Another Davis-Standard single screw extruder (diameter: 32 mm (1.25"); L/D=24/1) was used for the tie layer extrusion. A mixture for tie material was made by dry-blending pellets of 82% of an ethylene-based octene plastomer (Affinity® EG8200 from Dow Chemical Co.; density: 0.87 g/cm$^3$; melting point from DSC heating scan at 10° C./min: 60° C.; melt index (ASTM D1238): 5 g/10 minutes at 190° C. and 2.16 kg load; comonomer content: 24 Wt %), 15% of a styrene modified terpene resin (Sylvares® ZT105LT from Arizona Chemical; softening point: 105° C.) and 3% of a styrene-isoprene-styrene styrenic block copolymer (Vector® 4111 from Dexco Polymers, LP; density (ASTM D792): 0.93 g/cm$^3$; styrene content: 18 Wt %; diblock content: less than 1.0 Wt %; melt flow rate (ASTM D1238): 12 g/10 minutes at 200° C. and 5 kg load). The extrusion conditions are listed in Table 2.

TABLE 2

|  | 38 mm Extruder | 32 mm Extruder | 32 mm Extruder |
|---|---|---|---|
| Material | COC | Tie Layer | PCTFE |
| Extruder set temperature (° C.) | 235–249 | 207–240 | 271–281 |
| Screw speed (rpm) | 110 | 30 | 23 |
| Die set temperature (° C.) |  | 274 |  |
| Casting roll set temperature (° C.) |  | 38 |  |
| Chill roll set temperature (° C.) |  | 21 |  |

In the resulting film (PCTFE/tie/COC) of about 290 μm total thickness, the layer thicknesses were about 24 μm for a PCTFE layer, about 250 μm for a COC layer and about 16 μm for a tie layer. The interlayer bond strength of three-layer PCTFE/tie/COC film was determined by using a testing method (ASTM F904) as described in Example 1. The resulting average interlayer bond strength was about 1860 g/2.54 cm.

EXAMPLE 3

A three-layer PCTFE/tie/COC coextruded film was produced at the same condition as described in Example 2. With the same structure, the composition of tie material combination was changed to 82% of the same ethylene-based octene plastomer as of Example 2 and 15% of the same styrene modified terpene resin as of Example 2 and 3% of a styrenic block copolymer (Vector® 4114 from Dexco Polymers, LP density (ASTM D792): 0.92 g/cm$^3$; styrene content: 15 Wt %; diblock content: 42 Wt %; melt flow rate (ASTM D1238): 25 g/10 minutes at 200° C. and 5 kg load). The total and layer thicknesses of the resulting film were almost the same as those of Example 2.

The interlayer bond strength of the resulting film was determined by using a testing method (ASTM F904) as described in Example 1. The average interlayer bond strength was about 1720 g/2.54 cm.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A multilayered film comprising:
    a) a fluoropolymer layer having first and second surfaces;
    b) an adhesive tie layer, having first and second surfaces, on the fluoropolymer layer with the first surface of the adhesive tie layer on the first surface of the fluoropolymer layer; which adhesive tie layer comprises an adhesive combination of at least one tackifier, at least one ethylene/alpha-olefin copolymer and at least one styrenic block copolymer; and
    c) a thermoplastic polymer layer, having first and second surfaces, on the adhesive tie layer with the first surface of the thermoplastic polymer layer on the second surface of the adhesive tie layer.

2. The multilayered film of claim 1 further comprising at least one polymer layer on either the second surface of the fluoropolymer layer, the second surface of the thermoplastic polymer layer, or both.

3. The multilayered film of claim 2 wherein said at least one polymer layer is on the second surface of the fluoropolymer layer.

4. The multilayered film of claim 2 wherein said at least one polymer layer is on the second surface of the thermoplastic polymer layer.

5. The multilayered film of claim 2 wherein said at least one polymer layer is on both the second surface of the fluoropolymer layer and the second surface of the thermoplastic polymer layer.

6. The multilayered film of claim 2 wherein said at least one polymer layer is attached to either the second surface of the fluoropolymer layer, the second surface of the thermoplastic polymer layer, or both via another layer of said adhesive combination.

7. The multilayered film of claim 2 further comprising a plurality of polymer layers attached to either the second surface of the fluoropolymer layer, the second surface of the thermoplastic polymer layer, or both via another layer of said adhesive combination.

8. The multilayered film of claim 1 wherein said fluoropolymer layer comprises a material selected from the group consisting of ethylene-chlorotrifluoroethylene copolymer, ethylene-tetrafluoroethylene copolymer, fluorinated ethylene-propylene copolymer, perfluoroalkoxyethylene, polyclilorotrifluoroethylene, polytetrafluoroethylene, polyvinyl fluoride, polyvinylidene fluoride, and copolymers and blends thereof.

9. The multilayered film of claim 1 wherein said fluoropolymer layer comprises a chlorotrifluoroethylene homopolymer.

10. The multilayered film of claim 1 wherein said fluoropolymer layer comprises a poly(chlorotrifluoroethylene) containing copolymer.

11. The multilayered film of claim 1 wherein said thermoplastic polymer layer comprises a material selected from the group consisting of linear or branched polyolefin homopolymers, linear or branched polyolefin copolymers, cyclic olefin homopolymers, copolymers of cyclic olefins and linear or branched polyolefin homopolymers, copolymers of cyclic olefins and linear or branched polyolefin copolymers, ethylene vinyl acetate copolymers, polyesters, polyamides, polyvinyl chloride, polyvinylidene chloride, polystyrene, styrenic copolymers, polyisoprene, polyurethanes, ethylene ethyl acrylate, ethylene acrylic acid polymers, fluoropolymers and combinations thereof.

12. The multilayered film of claim 1 wherein said thermoplastic polymer layer comprises a cyclic olefin copolymer.

13. The multilayered film of claim 1 wherein said at least one tackifier comprises a material selected from the group consisting of terpene-based polymers, coumarone-based polymers, phenol-based polymers, rosin-based polymers, rosin esters and hydrogenated rosin esters, petroleum and hydrogenated petroleum-based polymers, styrene-based polymers and mixtures thereof.

14. The multilayered film of claim 1 wherein said at least one tackifier is selected from the group consisting of a terpene-based polymers, petroleum and hydrogenated petroleum-based polymers.

15. The multilayered film of claim 1 wherein said ethylene/alpha-olefin copolymer comprises a copolymer comprising an ethylene and at least one alpha-olefin having from three to twenty carbon atoms ($C_3$–$C_{20}$).

16. The multilayered film of claim 1 wherein said styrenic block copolymer is selected from the group consisting of a styrene/ethylene-propylene/styrene block copolymer, a styrene/ethylene ethylene-propylene random/styrene block copolymer, a styrene/butadiene/styrene block copolymer, a styrene/ethylene butylene randoml styrene block copolymer, a styrene/isobutylene/styrene block copolymer, a styrene/isoprene/styrene block copolymer, a styrene/hydrogenated butylene/styrene block copolymer and a maleic anhydride grafted styrene/ethylene butylene/styrene copolymer.

17. The multilayered film of claim 1 wherein said styrenic block copolymer comprises a styrene/isoprene/styrene copolymer.

18. The multilayered film of claim 1 wherein said styrenic block copolymer comprises a styrene/ethylene butylene random/styrene block copolymer.

19. The multilayered film of claim 1 wherein said tackifier comprises from greater than about 1% by weight to about 70% by weight of said adhesive combination.

20. The multilayered film of claim 1 wherein said tackifier comprises from about 5% by weight to about 30% by weight of said adhesive combination.

21. The multilayered film of claim 1 wherein said tackifier comprises from about 15% by weight to about 25% by weight of said adhesive combination.

22. The multilayered film of claim 1 wherein said at least one ethylene/alpha-olefin copolymer comprises from greater than about 40% by weight to about 98.9% by weight of said adhesive combination.

23. The multilayered film of claim 1 wherein said at least one ethylene/alpha-olefin copolymer comprises from about 70% by weight to about 95% by weight of said adhesive combination.

24. The multilayered film of claim 1 wherein said at least one ethylene/alpha-olefin copolymer comprises from about 75% by weight to about 85% by weight of said adhesive combination.

25. The multilayered film of claim 1 wherein said at least one styrenic block copolymer comprises from greater than about 0.1% by weight to about 80% by weight of said adhesive combination.

26. The multilayered film of claim 1 wherein said at least one styrenic block copolymer comprises from about 0.5% by weight to about 15% by weight of said adhesive combination.

27. The multilayered film of claim 1 wherein said at least one styrenic block copolymer comprises from about 1% by weight to about 6% by weight of said adhesive combination.

28. The multilayered film of claim 1 wherein each of said layers are coextruded.

29. The multilayered film of claim 2 wherein said at least one polymer layer comprises a material selected from the group consisting a fluoropolymer, a polyamide, a polyolefin, an ethylene vinyl acetate copolymer, polyethylene terephthalate, polyvinyl chloride, polyvinylidene chloride, polystyrene, styrenic copolymers, polyisoprene, polyurethanes, an ethylene acrylic acid polymer, a cyclic olefin homopolymer or copolymer and combinations thereof.

30. The multilayered film of claim 1 wherein the film is uniaxially oriented, biaxially oriented or a blown film.

31. The multilayered film of claim 1 wherein the film is uniaxially oriented from about 1.3 to about 10 times in either its longitudinal or transverse directions.

32. The multilayered film of claim 1 wherein the film is biaxially oriented from about 1.5 to about 5 times each of its longitudinal and transverse directions.

33. The multilayered film of claim 1 wherein said film is formed into an article suitable for packaging moisture sensitive products.

34. The multilayered film of claim 1 wherein said film is thermoformed into an article suitable for packaging moisture sensitive products.

35. A tube formed from the multilayered film of claim 1.

36. A multilayered film comprising:
a) a poly(chlorotrifluoroethylene) layer having first and second surfaces;
b) an adhesive tie layer, having first and second surfaces, on the poly(chlorotrifluoroethylene) layer with the first surface of the adhesive tie layer on the first surface of the poly(chlorotrifluoroethylene) layer; which adhesive tie layer comprises an adhesive combination of at least one tackifier, at least one ethylene/alpha-olefin copolymer and at least one styrenic block copolymer;
c) a cyclic olefin copolymer layer, having first and second surfaces, on the adhesive tie layer with the first surface of the cyclic olefin copolymer layer on the second surface of the adhesive tie layer; and
d) at least one polymer layer on either the second surface of the poly(chlorotrifluoroethylene) layer, the second surface of the cyclic olefin copolymer layer, or both.

37. The multilayered film of claim 36 wherein said film is formed into an article suitable for packaging moisture sensitive products.

38. The multilayered film of claim of claim 36 wherein said film is thermoformed into an article suitable for packaging moisture sensitive products.

39. A tube formed from the multilayered film of claim 36.

40. A process for forming a multilayered film comprising:
a) forming a fluoropolymer layer having first and second surfaces;
b) attaching an adhesive tie layer, having first and second surfaces, to the polyolefin layer with the first surface of the adhesive tie layer on the first surface of the polyolefin layer; which adhesive tie layer comprises an adhesive combination of at least one tackifier, at least one ethylene/alpha-olefin copolymer and at least one styrenic block copolymer; and c) attaching a thermoplastic polymer layer, having first and second surfaces, to the adhesive tie layer with the first surface of the thermoplastic polymer layer on the second surface of the adhesive tie layer.

41. The process of claim 40 wherein said multilayer film is formed into an article by injection molding, co-injection blow molding, co-injection stretch-blow molding or coextrusion blow molding techniques.

42. The process of claim 40 wherein said fluoropolymer layer, said adhesive tie layer and said thermoplastic polymer layer are coextruded.

43. The process of claim 40 wherein said multilayered film is formed into an article suitable for packaging moisture sensitive products.

44. The process of claim 40 wherein said film is thermoformed into an article suitable for packaging moisture sensitive products.

45. The process of claim 40 wherein said multilayered film is formed into a tube.

* * * * *